United States Patent [19]
Guillet

[11] Patent Number: 5,271,215
[45] Date of Patent: Dec. 21, 1993

[54] NATURAL GAS STREAM TURBINE SYSTEM OPERATING WITH A SEMI-OPEN CYCLE

[75] Inventor: Rémi Guillet, Pierrefitte, France
[73] Assignee: Gaz de France, Paris, France
[21] Appl. No.: 850,582
[22] Filed: Mar. 13, 1992
[30] Foreign Application Priority Data
  Mar. 18, 1991 [FR] France ............... 91 03247
[51] Int. Cl.⁵ ............................................. F02C 7/08
[52] U.S. Cl. ................................. 60/37.5; 60/39.53; 60/39.55
[58] Field of Search ............... 60/39.05, 39.53, 39.5, 60/39.52, 39.55

[56] References Cited

U.S. PATENT DOCUMENTS

| | | | |
|---|---|---|---|
| 3,657,879 | 4/1972 | Ewbank et al. | 60/39.53 |
| 3,868,818 | 3/1975 | Itoh | 60/39.55 |
| 4,426,842 | 1/1984 | Collet | 60/39.52 |
| 4,509,324 | 4/1985 | Urbach et al. | 60/39.5 |
| 4,829,763 | 5/1989 | Rao | 60/39.05 |
| 4,866,928 | 9/1989 | Raiko | 60/39.05 |

FOREIGN PATENT DOCUMENTS

| | | |
|---|---|---|
| 0278609 | 8/1988 | European Pat. Off. |
| 0318706 | 6/1989 | European Pat. Off. |
| 3331153 | 3/1985 | Fed. Rep. of Germany |
| 2187273 | 9/1987 | United Kingdom |
| 8803605 | 5/1988 | World Int. Prop. O. |

*Primary Examiner*—Richard A. Bertsch
*Assistant Examiner*—Michael I. Kocharov
*Attorney, Agent, or Firm*—Bucknam and Archer

[57] ABSTRACT

The system comprises at least one combustion chamber, an expansion turbine, an air compressor driven by the expansion turbine, and means for coupling the expansion turbine to at least one external receiver of mechanical energy. The system further includes means for injecting water to constitute a thermal ballast in the combustion chamber, the quantity of compressed air used remaining close to the quantity of oxidizing air required for stoichiometric combustion. These additional water injection means comprise:

a) a mass and heat exchanger for exchanging mass and heat between the combustion products from a condensation recuperator placed on the path of the exhaust gases from the expansion turbine and incoming atmospheric air to enable the air to be pre-moistened prior to entering the compressor; and b) devices for injecting steam and liquid water between the outlet from the air compressor and the inlet to the burner, or into the combustion chamber after the combustion zone and before the first blades of the expansion turbine, the injected steam being produced by a steam recuperator-generator-superheater disposed on the exhaust gases immediately after they leave the expansion turbine, and the liquid water being obtained by recycling the condensed water produced in the condensation recuperator.

13 Claims, 2 Drawing Sheets

NATURAL GAS STREAM TURBINE SYSTEM OPERATING WITH A SEMI-OPEN CYCLE

The present invention relates to a natural gas turbine system comprising at least one combustion chamber fitted with a burner fed firstly with gaseous fuel and secondly with oxidizing air, an expansion turbine having blades to which the combustion gases are applied, an air compressor driven by the expansion turbine to compress the flow of oxidizing air applied to said burner, and means for coupling the expansion turbine to at least one external receiver of mechanical energy.

BACKGROUND OF THE INVENTION

Stationary gas turbines have been in use for several years, in particular in association with steam turbines for producing electricity, and in particular in co-generation applications, i.e. applications where both mechanical work and heat energy are supplied simultaneously.

At present, although the overall mechanical efficiency of the most recent gas turbines is as good as that of steam turbines, the efficiency of gas turbines is nevertheless degraded for an expansion turbine by the need to produce work to compress air. This work becomes all the greater because in order to avoid excessively hot gases damaging the turbine, it has appeared necessary to compress an excess amount of air together with the oxidizing air, with the excess often being greater than twice the volume of the oxidizing air. At present, the maximum limiting temperature that can be accepted by expansion turbines exceeds 1000° C., but cannot be raised significantly beyond about 1250° C.

It will also be observed that the overall mechanical efficiency of a gas turbine is naturally highly sensitive to the polytropic efficiency of the turbo compressor.

Furthermore, at equal power, the size of the expansion turbine of "gas turbines" that must produce work firstly for driving the compressor is considerably greater than the size of a steam turbine and it increases very quickly with decreasing mechanical efficiency.

Finally, it is necessary to provide an air compressor driven by the shaft of the gas turbine, and the size of the compressor also increases very quickly with decreasing mechanical efficiency of the compressor.

It should also be remembered that for purposes of protecting the environment, efforts are now being made with combustion heat engines to reduce emissions of nitrogen oxides.

One technique that is well known consists in acting at source by "quenching" the flame with liquid water or steam as close as possible to the reaction zones.

However, since water is injected to give rise to a quenching phenomenon, the injection must be under accurate control and must be quantitatively limited to avoid any deterioration of combustion proper, and in particular to avoid any carbon monoxide appearing.

In addition, "quenching" the flame is of limited efficiency since it acts only on the time spent at high temperature by elements that may combine to form nitrogen oxides (NOx) without acting on the maximum temperature reached within the reaction zone or on the adiabatic combustion temperature.

The present invention seeks to remedy the above-mentioned drawbacks and to enable a natural gas turbine system to be implemented which makes it possible both to reduce the size of the rotary machines used, and to improve performance from the energy, mechanical, and, in the event of co-generation, thermal points of view, while simultaneously providing better protection for the environment.

SUMMARY OF THE INVENTION

According to the invention, these objects are achieved by a turbine system using natural gas and steam operating in a semi-open cycle and comprising at least one combustion chamber fitted with a burner fed firstly with gaseous fuel and secondly with oxidizing air, an expansion turbine having blades to which the combustion gases are applied, an air compressor driven by the expansion turbine to compress the flow of oxidizing air applied to said burner, and means for coupling the expansion turbine to at least one external receiver of mechanical energy, wherein the system includes a mass and heat exchanger for exchanges between the combustion products coming from a condensation recuperator placed on the path of the exhaust gases from the expansion turbine and the incoming atmospheric air to enable the air to be premoistened prior to entering the compressor.

The system may further include one of the following means:

a) a steam injection device disposed in the compressed oxidizing air zone situated between the outlet of the air compressor and the inlet of the burner, the injected steam being produced by a steam recuperator-generator-superheater disposed on the path of the exhaust gases immediately on leaving the expansion turbine;

b) a steam injection device disposed in the combustion chamber, after the combustion zone and before the first blades of the expansion turbine, the injected steam being produced by a steam recuperator-generator-superheater disposed on the path of the exhaust gases immediately on leaving the expansion turbine;

c) a liquid water injection device disposed in the compressed oxidizing air zone situated between the outlet from the air compressor and the inlet of the burner, the liquid water being obtained from recycling the condensed water produced in a condensation recuperator placed on the path of the exhaust gases from the expansion turbine and collecting both the sensible heat and the latent heat of the exhaust gases; and d) a liquid water injection device disposed in the combustion chamber after the combustion zone and before the first blades of the expansion turbine, the liquid water being obtained from recycling the condensed water produced in a condensation recuperator placed on the path of the exhaust gases from the expansion turbine and collecting both the sensible heat and the latent heat of the exhaust gases.

All of the injected water constitutes thermal ballast in the combustion chamber, with the quantity of compressed air used approaching that required for stoichiometric combustion.

Except for the water recycled by the mass and heat exchanger or "vapor pump", all of the injected water constituting the thermal ballast which replaces the excess combustion air normally required for keeping the hot compressed gases from combustion below the maximum acceptable inlet temperature for the expansion turbine is then compressed while in the liquid phase and therefore requires only a negligible quantity of mechanical energy for that purpose.

The system includes a common steam recuperator-generator-superheater disposed on the path of the exhaust gases immediately on leaving the expansion turbine for feeding steam both to the steam injection device disposed in the compressed oxidizing air zone between the outlet from the air compressor and the inlet to the burner, and the steam injection device disposed in the combustion chamber after the combustion zone and before the first blades of the expansion turbine.

The system advantageously includes a common condensation recuperator placed on the path of the exhaust gases from the expansion turbine and collecting both the sensible heat and the latent heat of the exhaust gases to feed a condensate collector with condensates, the condensate collector being provided with a device for maintaining and controlling the quality of the water fed as liquid water to a recuperation tank. A feed duct is provided from the recuperation tank for feeding the steam recuperator-generator-superheater with recycled water under pressure. Liquid water is also recycled from the same tank both to the liquid water injection device disposed in the compressed oxidizing air zone situated between the outlet from the air compressor and the inlet to the burner, and to the liquid water injection device disposed in the combustion chamber after the combustion zone and before the first blades of the expansion turbine.

The steam recuperator-generator-superheater and the condensation recuperator are disposed one after the other in that order on the path of the exhaust gases leaving the expansion turbine.

To enable liquid water to be supplied under pressure, the system also includes at least one pump disposed on a duct for recycling liquid water from the recuperation tank.

According to a particular aspect of the invention, the steam recuperator-generator-superheater acting on the exhaust gases from the expansion turbine and disposed between the outlet of the expansion turbine and the condensation recuperator, may serve equally well to produce steam for a purpose other than being fed to the steam injection devices within the system.

Where appropriate, the system may include an additional burner fed with fuel gas and with oxidizing air and associated with the steam recuperator-generator-superheater.

It is also possible to provide means for feeding the liquid water injection devices from an external source of water.

The invention also applies to systems implementing multistage air compressors. Under such circumstances, a plurality of liquid water or steam injection devices may be distributed between the various stages of the compressor.

The invention may also be applied to existing systems, e.g. to a set of two gas turbines for which only one compressor is put into operation.

The invention also provides a system comprising first and second combustion chambers each fitted with its own burner fed with gaseous fuel and with oxidizing air, and first and second expansion turbines to which the combustion gases from the first and second combustion chambers respectively are applied, a single steam recuperator-generator-superheater, a single condensation recuperator, and a single mass and heat exchanger all disposed in succession and in that order on the path of the exhaust gases leaving the first and second expansion turbines, a single air compressor driven by said first and second expansion turbines, and an oxidizing air distributor for distributing air to each of the burners associated with the first and second combustion chambers, the distributor being disposed downstream from a steam injection device itself disposed in the compressed oxidizing air zone situated downstream from the outlet of the air compressor and upstream from a liquid water injection device likewise disposed in the compressed oxidizing air zone situated downstream from the outlet of the air compressor, the mass and heat exchanger acting between the combustion products from the sole condensation recuperator placed on the path of the exhaust gases from the first and second expansion turbines and incoming atmospheric air to enable the air to be premoistened prior to entering the compressor.

In general, the system of the invention makes it possible to operate gas turbines in a semi-open cycle because of the water reinjection (after monitoring the quality of the water at different levels, both in the form of steam and in the form of liquid), which water is recovered after condensation as a result of the expanded gases passing through a condensation recuperator, with the reinjected water constituting thermal ballast that takes the place of and replaces conventional excess air, so that it is always possible in the limit to use no more oxidizing air than is strictly necessary for stoichiometric combustion.

The relative proportions of quantities of water in both states makes it possible to maintain the pressure and temperature conditions at the output from the compressor and at the inlet to the expansion turbine at optimum values.

Amongst the advantages of the invention, it may be observed firstly that it is possible to reduce significantly the size of the compressor used relative to the size of the compressor in a traditional gas turbine because there is no longer any need to inject a large quantity of excess air into the combustion chamber.

In addition, for given dimensions and thermodynamic conditions, the mechanical power available from the turbine is increased substantially, and a power increase of about 60% is observed relative to the power from a traditional cycle gas turbine.

When a mass and heat exchanger is used (also called a "vapor pump"), the mechanical efficiency is further increased so that it is always greater than the efficiency of a traditional gas turbine, and the overall thermal efficiency may exceed 90% "gross" or "higher" calorific value (HCV) if co-generation takes place by useful recovery of maximum sensible heat and latent heat from the steam.

The measures put forward in the context of the present invention are also highly favorable from the point of view of protecting the environment since compared with known gas turbines, the oxidizing air is cooled prior to combustion which takes place using moist air, i.e. air conveying inert gases causing the adiabatic combustion temperature to be reduced.

The two above factors make it possible to envisage reducing nitrogen oxide formation (NOx) by a factor of about 3 to 1.

The semi-open cycle system of the invention may be applied to existing turbo compressors, e.g. using an existing machine if it is acceptable to overload the expansion turbine slightly or using two machines while making use of the compressor of one of them only.

BRIEF DESCRIPTION OF THE DRAWINGS

Embodiments of the invention are described by way of example with reference to the accompanying drawings, in which.

DETAILED DESCRIPTION

Figure 1:
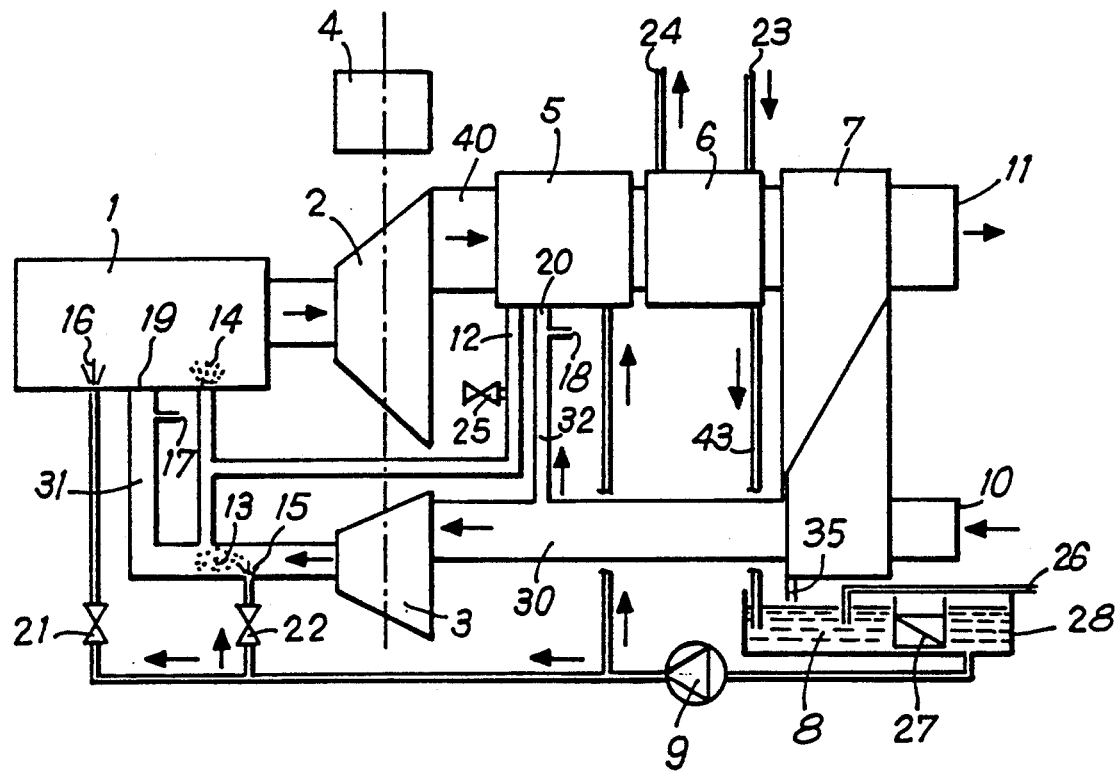
FIG. 1 is a diagrammatic overall view of a natural gas turbine co-generation system of the invention using a single turbo compressor.

FIG. 1 shows an installation of the invention making it possible to obtain both work and heat from fuel constituted by natural gas, the mechanical work being obtained from an expansion turbine 2 and being received on a mechanical energy receiver 4 such as an alternator, and the heat energy being obtained from the expanded hot gases from the expansion turbine 2.

The installation shown in FIG. 1 comprises, in conventional manner, a combustion chamber 1 fitted with a burner 19 fed with fuel gas via an injector 17 and with oxidizing air via a compressed air feed duct 31. The combustion products from the combustion chamber 1 are applied to the blades of the expansion turbine 2 which drives both the receiver 4 and an air compressor 3 which serves to compress atmospheric air taken from a main duct 30 for supplying compressed air to the duct 31.

Unlike traditional installations, the compressor 3 may be of small dimensions since in the installation of the invention it suffices to supply the burner 19 via the duct 31 merely with a quantity of oxidizing air close to that required for stoichiometric combustion. The useful mechanical power available from the expansion turbine 2 can thus be increased substantially.

In order to maintain the gases at the outlet from the combustion chamber 1 for application to the expansion turbine 2 at a temperature which is not too high for the blades of said turbine, e.g. at a temperature that does not exceed about 1250° C. with a feed pressure of about 15 bars, the invention provides a thermal ballast in the combustion chamber 1, by injecting water as steam or in liquid form.

To do this, a steam injection device 13 is situated between the outlet of the compressor 3 and the burner 19, as shown in FIG. 1.

A steam injection device 14 is also disposed in the combustion chamber 1 after the combustion zone and before the first blades of the expansion turbine 2.

A first liquid water injection device 15 is disposed on the duct 31 connecting the outlet of the compressor 3 to the burner 19, e.g. upstream from the steam injection device 13.

A second liquid water injection device 16 is advantageously disposed on the combustion chamber 1 so as to be capable of injecting water directly into the combustion chamber 1, after the combustion zone and before the first blades of the expansion turbine 2.

Adjustment valves 21 and 22 serve to adjust the quantity of water that is injected by the injection devices 15 and 16 so as to optimize operating conditions.

By acting on the proportions of liquid water and steam that are injected into the compression zone, firstly between the outlet of the compressor 3 and the inlet to the burner 19, and secondly directly into the combustion chamber 1, it is possible to achieve sufficient thermal ballast in the combustion chamber 1 to avoid any need for excess air, while maintaining optimum pressure and temperature conditions at the outlet of the compressor 3 and at the inlet of the expansion turbine 2.

If the air compressor 3 comprises a plurality of stages, it is possible to place a plurality of devices 15, 13 for injecting water in liquid form and as steam that are distributed over the various stages of the air compressor so as to tend towards isothermal compression.

One or more pumps 9 are disposed on the liquid water feed ducts for the liquid water injection devices 15 and 16 or for the steam recuperator-generator-superheater 5 to enable the liquid water to be raised to the pressure required for spraying it, or to its vaporization pressure.

In FIG. 1, it can be seen that a steam recuperator-generator-superheater device 5 is placed on the duct 40 for evacuating the exhaust gases from the outlet of the expansion turbine 2. The steam produced in the recuperator device 5 is evacuated by a duct 12 firstly to an outlet valve 25 for steam for external use, and secondly to the steam injection devices 13 and 14. The valve 25 serves, inter alia, to adjust the steam flow rate applied to the steam injection devices 13 and 14 and likewise the adjustment valves 21 and 22 enable the liquid water flow rates injected by the injection devices 15 and 16 to be adjusted.

Optionally, an additional gas burner 20 may be added to the steam recuperator-generator-superheater device 5 to optimize the formation of steam as required for feeding to the injection devices 13 and 14. The additional burner 20 is associated with a fuel gas injection device 18 and with a duct 32 for feeding moist oxidizing air coming from the vapor pump 7, which duct may be a branch from the main duct 30 feeding the compressor 3 with atmospheric air.

A condensation recuperator device 6 is disposed downstream from the steam recuperator-generator-superheater device 5 on the duct 40 for the outlet gases from the expansion turbine 2. The condensor recuperator device 6 includes an inlet 23 and an outlet 24 for an external heat-conveying fluid, and it also includes an outlet 43 for condensates which are delivered to a condensate-collector at 8.

A duct 26 also opens out into the condensate collector 8. This duct 26 constitutes a return for condensates generated outside the system when the steam available from the valve 25 is used externally.

A device 27 is associated with the condensate collector 8 to monitor the quality of the water and in particular to adjust its pH. After passing through the ph-regulating device 27, the condensates in the collector 8 are collected in a tank 28 constituting a water supply ready for being reinjected into the system via the pump 9 for feeding liquid water both to the injection devices 15 and 16 via the adjustment valves 21 and 22, and to the steam recuperator-generator-superheater device 5.

When so required, particularly while starting, the tank 28 may receive additional liquid water from a source external to the system. Nevertheless, in normal operation, the system is self-sufficient in water, and indeed it generates excess water.

According to an important aspect of the present invention, the system incorporates a mass and heat exchanger 7 acting between the exhaust gases leaving the recuperators 5 and 6 on the duct 40 for evacuation via a flue gas outlet 11, and fresh air entering the main duct 30 from an atmospheric air inlet 10.

Various examples of mass and heat exchangers, also referred to as vapor pumps, which enable that a greater or lesser fraction of the sensible energy and the latent energy contained in the combustion products leaving condensation generators to be recycled to oxidizing air required by a thermal process, are known e.g. from Document FR-B-2 446 460, or Document FR-B-2 508 616, or are described in French patent application No. 89 13945, which corresponds to 5,178,200 for example.

Using a vapor pump 7 makes it possible to recycle any remaining enthalpy by premoistening the atmospheric air injected via the air inlet 10 into the main duct 30 before the air enters the compressor 3.

This premoistening of atmospheric air, and more generally this use of the vapor pump 7, thus makes it possible to further improve the performance of the cycle both from the overall energy and thermodynamic performance point of view and from the point of view of reducing the production of nitrogen oxides. FIG. 1 shows that the excess condensates from the vapor pump 7 are sent to the condensate collector 8 via a duct 35.

An application of the present invention to an installation including two turbo compressors is now described with reference to FIG. 2.

Figure 2:
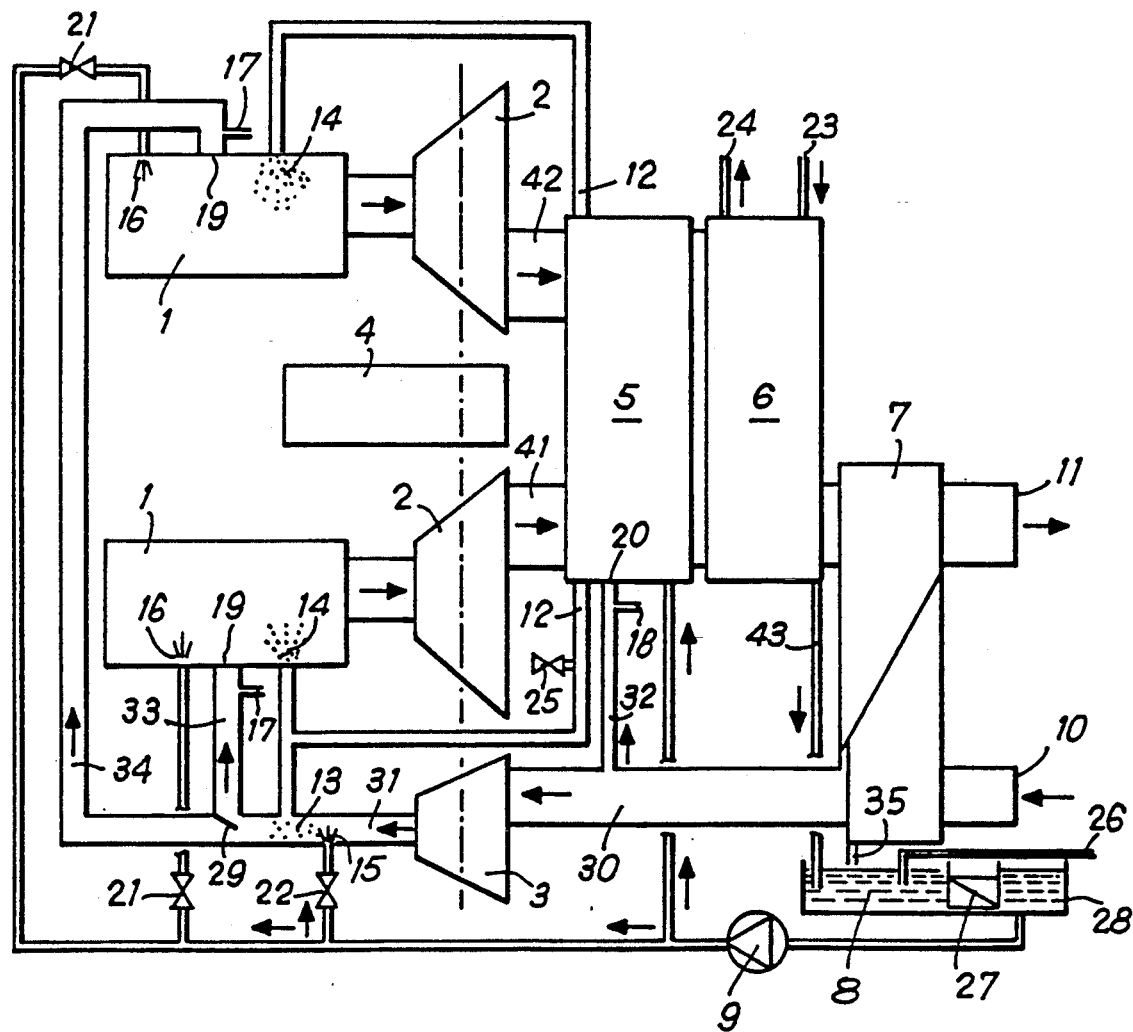
FIG. 2 is a diagrammatic overall view of a natural gas turbine co-generation system of the invention using two turbo compressors but only one air compressor.

As can be seen in FIG. 2, it is possible to use only one air compressor 3 in association with two expansion turbines 2 each associated with a respective combustion chamber 1, thereby increasing the mechanical power available at the outlet for one or more receivers 4.

The diagram of FIG. 2 is very similar to that of FIG. 1 and items that are common to both are given the same reference numerals and are not described again.

The duct 31 for feeding air under pressure situated at the outlet of the compressor 3 and into which water is injected in liquid form or in the form of steam by the injection devices 15 and 13, splits into two secondary ducts 33 and 34 each of which feeds oxidizing air to the burner 19 of one of the combustion chambers 1. A deflector flap 29 is located where the two secondary ducts 33 and 34 join the main duct 31 to enable the distribution of pressurized moist air to each of the burners 19 to be adjusted.

Each of the combustion chambers 1 is also provided with its own liquid water injection device 16, taking water from that contained in the tank 28, and with its own steam injection device 14 taking water supplied by a duct 12 coming from a steam recuperator-generator-superheater device 5 which receives all of the expanded gases provided by both expansion turbines 2 via ducts 41 and 42. A condensation recuperator device 6 is also placed in cascade with the steam recuperator-generator-superheater device 5, downstream therefrom, as is the case in FIG. 1.

The expanded combustion gases from the condensation recuperator device 6 are then sent to the flue gas evacuation outlet 11 via a vapor pump 7, as in the diagram of FIG. 1.

To show up the advantages of turbine systems using natural gas and steam and operating in a semi-open cycle in accordance with the present invention, relative to conventional gas turbine systems, there follows a table comparing the performance of various embodiments of a turbine system using natural gas and steam in accordance with the invention, referenced TGV 0, TGV 40, TGV 55, and TGV 70, all compared with a conventional gas turbine TG, operating under the same conditions of temperatures and pressure at the inlet to the expansion turbine 2 (1250° C., 15 bars).

TABLE

| Configuration | TG | TGV0 | TGV40 | TGV55 | TGV70 |
|---|---|---|---|---|---|
| Temperature of saturated oxidizing air at the outlet from the vapor pump | — | no vapor pump | 40° C. | 55° C. | 70° C. |
| Optimum air factor | 2.70 | 1.80 | 1.70 | 1.50 | 1.15 |
| T.E. (% HCV) | 73 | 69 | 78 | 90 | 96 |
| Rm 80.85 (% LCV) | 34.4 | 42 | 42 | 41 | 40 |
| NOx effect | — | — | −30% (probable minimum) | −60% (probable minimum) | |
| Td 0.85 | 1 | 0.83 | 0.89 | 0.91 | 0.89 |
| Tc 0.85 | 1 | 0.52 | 0.60 | 0.62 | 0.62 |

The abbreviations used in the table are explained below.

| | |
|---|---|
| TG: | Prior art gas turbine, constituting a reference. |
| TGV0: | Natural gas and steam turbine without a vapor pump. |
| TGV40,) TGV55,) TGV70:) | Natural gas and steam turbine with a vapor pump producing saturated oxidizing air respectively at 40° C., at 55° C., and at 70° C. at the outlet from the vapor pump. |
| T.E.: | Total energy efficiency (relative to HCV and in the event that the heat recovered in the condensation recuperator heats the water from 65° C. to 85° C.). |
| Rm 0.85: | Mechanical efficiency of the turbine if the polytropic efficiency of the expansion turbine and of the compressor are both 0.85 (efficiency relative to "net" or "lower" calorific value (LCV)). |
| NOx effect: | Minimum probable reduction in NOx formation relative to the gas turbine TG. |
| Td 0.85 and Tc 0.85: | Respective sizes of the expansion turbine and of the comparator, compared with the size of the TG version. |

I claim:

1. A turbine system using natural gas and steam operating in a semi-open cycle and comprising at least one combustion chamber fitted with a burner fed firstly with gaseous fuel and secondly with oxidizing air, at least one expansion turbine having blades to which the combustion gases are applied, an air compressor driven by at least one said expansion turbine to compress the flow of oxidizing air applied to said burner, and means for coupling the expansion turbine to at least one external receiver of mechanical energy, wherein the system includes a mass and heat exchanger for exchanges between the combustion products coming from a condensation recuperator placed on the path of the exhaust gases from the expansion turbine and the incoming atmospheric air to enable the air to be pre-moistened prior to entering the compressor.

2. A system according to claim 1, including a common condensation recuperator placed on the path of the exhaust gases from said at least one expansion turbine and collecting both the sensible heat and the latent heat of the exhaust gases to feed a condensate collector with condensates, the condensate collector being provided with a device for maintaining and controlling the quality of the water fed as liquid water to a recuperation tank.

3. A system according to claim 2, including a liquid water injection device disposed in the compressed oxidizing air zone situated between the outlet from the air compressor and the inlet of the burner, the liquid water being obtained from the recuperation tank.

4. A system according to claim 2, including a liquid water injection device disposed in said at least one combustion chamber after the combustion zone and before the first blades of the expansion turbine, the liquid water being obtained from the recuperation tank.

5. A system according to claim 2, including a common steam recuperator-generator-superheater disposed on the path of the exhaust gases immediately on leaving said at least one expansion turbine, and a duct feeding the steam recuperator-generator-superheater with recycled water taken from the water contained in said recuperation tank.

6. A system according to claim 5, including a steam injection device disposed in the compressed oxidizing air zone situated between the outlet of the air compressor and the inlet of the burner, the injected steam being produced by the common steam recuperator-generator-superheater disposed on the path of the exhaust gases immediately on leaving said at least one expansion turbine.

7. A system according to claim 5, including a steam injection device disposed in said at least one combustion chamber after the combustion zone and before the first blades of said at least one expansion turbine, the injected steam being produced by the common steam recuperator-generator-superheater disposed on the path of the exhaust gases immediately on leaving the expansion turbine.

8. A system according to claim 5, wherein the steam recuperator-generator-superheater and the condensation recuperator are disposed in succession in that order on the path of the exhaust gases leaving said at least one expansion turbine.

9. A system according to claim 2, further including at least one pump disposed on a duct for recycling liquid water from the recuperation tank.

10. A system according to claim 5, further including an additional burner provided with fuel gas and with oxidizing air and associated with the steam recuperator-generator-superheater.

11. A system according to claim 3, further including means for feeding each of the liquid water injection devices from an external source of water.

12. A system according to claim 1, including a multi-stage compressor and a plurality of liquid water and steam injection devices distributed between the various stages of the compressor.

13. A turbine system using natural gas and steam operating in a semi-open cycle and comprising first and second combustion chambers each fitted with its own burner fed with gaseous fuel and with oxidizing air, and first and second expansion turbines to which the combustion gases from the first and second combustion chambers respectively are applied, a single steam recuperator-generator-superheater, a single condensation recuperator, and a single mass and heat exchanger all disposed in succession and in that order on the path of the exhaust gases leaving the first and second expansion turbines, a single air compressor driven by said first and second expansion turbines, and an oxidizing air distributor for distributing air to each of the burners associated with the first and second combustion chambers, the distributor being disposed downstream from a steam injection device which is itself disposed in the compressed oxidizing air zone situated downstream from the outlet of the air compressor and upstream from a liquid water injection device likewise disposed in the compressed oxidizing air zone situated downstream from the outlet of the air compressor, the mass and heat exchanger acting between the combustion products from the sole condensation recuperator placed on the path of the exhaust gases from the first and second expansion turbines and incoming atmospheric air to enable the air to be pre-moistened prior to entering the compressor.

* * * * *